Nov. 21, 1967

L. N. DAVIS 3,353,836

NESTING SHOPPING CARRIER

Filed Sept. 9, 1965

INVENTOR.
LYNN N. DAVIS

BY

ATTORNEYS

Nov. 21, 1967  L. N. DAVIS  3,353,836
NESTING SHOPPING CARRIER

Filed Sept. 9, 1965  2 Sheets-Sheet 2

INVENTOR.
LYNN N. DAVIS

BY
ATTORNEYS

United States Patent Office 3,353,836
Patented Nov. 21, 1967

3,353,836
NESTING SHOPPING CARRIER
Lynn N. Davis, Emmett Township, Calhoun County, Mich., assignor to United Steel and Wire Company, Battle Creek, Mich., a corporation of Michigan
Filed Sept. 9, 1965, Ser. No. 486,164
11 Claims. (Cl. 280—33.99)

ABSTRACT OF THE DISCLOSURE

A nesting shopping carrier having an article-supporting container, preferably a basket, supported on an upstanding frame. The frame includes a rigid portion which underlies and supports the bottom wall of the basket intermediate its ends. The bottom wall of the basket is downwardly stepped just behind the underlying portion of the frame whereby the lowered portion of the bottom basket wall allows the underlying frame portion of another similar carrier located to the rear thereof to be moved into the rear end of the basket without interference as such carriers are placed in nesting positions.

---

This invention relates to a shopping carrier construction and more particularly relates to improved frame and basket construction for a nesting shopping carrier.

Shopping carriers of the nesting type, which are widely used in supermarkets and the like, are often subjected to rought handling. Further, the baskets of these carriers are often heavily loaded. In view of the potential damage to store-customer relations which may result from failure of such shopping carriers in use, any failure of the carrier while in use is highly undesirable.

The problem of providing a shopping carrier capable of withstanding harsh punishment and overloading is compounded by the necessity of maintaining the cost of the carrier within competitive limits. Moreover, the carrier must be pleasing in appearance.

In one successful prior shopping carrier capable of handling unusually heavy loads, a part of the carrier frame is located beneath the bottom panel of the basket of the carrier intermediate the ends thereof for supporting the weight of the basket and its contents.

However, such prior carrier has not been capable of nesting as closely as may be desired in some circumstances. More particularly, the relatively thick frame portion located beneath the basket tends to interfere with close spacing of the basket bottoms of successive nesting carriers. As a result, the rearward carrier cannot be inserted into the forward one to the extent possible in other types of carriers in which the basket is cantilevered from the back end thereof. Thus, the length of a nested line of such prior carriers substantially exceeds the length of the line of an equal number of carriers having cantilevered baskets. Thus, such prior reinforced carriers tend to require substantially more storage space in the store, space that could otherwise be used for saleable merchandise or additional carriers.

Accordingly, the objects of this invention include:

(1) To provide an improved frame and basket construction for nesting type of shopping carrier in which a portion of the frame underlies and supports the basket bottom intermediate the ends of such bottom.

(2) To provide a construction, as aforesaid, in which the basket bottom is provided with a stepped down portion at the rearward end thereof for receiving thereabove the basket bottom supporting portion of the frame of a further, nesting carrier.

(3) To provide a construction, as aforesaid, which is pleasing in appearance, which is competitive in cost with previous shopping carriers and which is sufficiently strong as to resist rough handling and substantial overloading over long periods of use without noticeable effect.

(4) To provide a construction, as aforesaid, which includes a frame portion of substantial rigidity and thickness extending transversely and longitudinally beneath the basket intermediate the ends of such basket for supporting the bottom of the basket over a relatively wide area.

(5) To provide a construction, as aforesaid, in which the bottoms of adjacent ones of nesting carriers are closely spaced from each other over a major portion of the areas thereof.

(6) To provide a construction, as foresaid, in which means are provided to prevent interference of the portion of the frame underlying the basket of one carrier with the basket bottom of a further carrier which receives the one carrier in nesting relationship therewithin, in which the presence of the underlying frame portion in no way interferes with the normal nesting of the carriers and in which the length of a line of nesting carriers embodying the inventon is not materially different from the length of a line of carriers having cantilevered baskets.

(7) To provide a construction, as aforesaid, in which substantially all of the bottom of the carrier basket is inclined upwardly and forwardly at a relatively small acute angle to the horizontal and in which the angle of inclination is substantially similar to that found in prior nesting carriers having cantilevered baskets.

Other objects and purposes of this invention will be apparent to persons acquainted with apparatus of this general type upon reading the following specification and inspecting the accompanying drawings.

Figure 1:
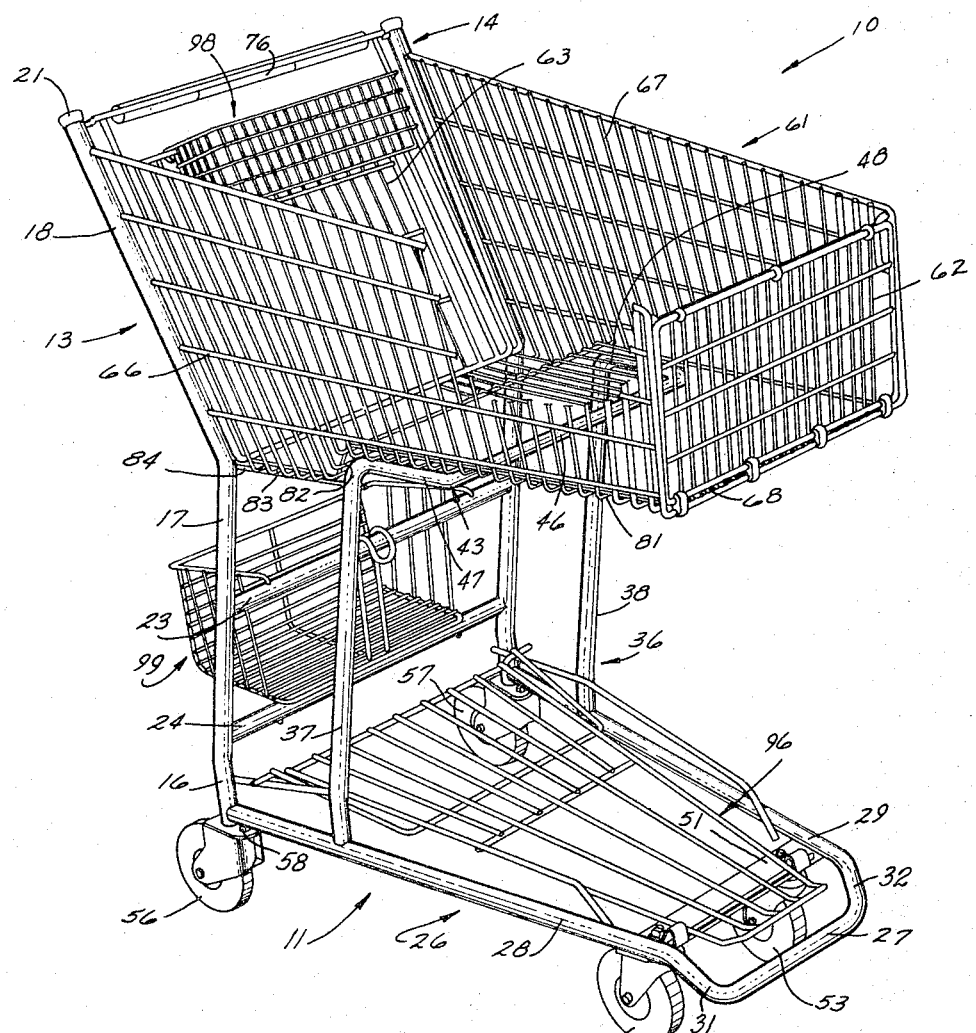
FIGURE 1 is a partially broken oblique view of a shopping carrier embodying the invention.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal direction of forward motion of the carrier and to the opposite direction, respectvely, such directions being to the right and left, respectively, in FIGURES 1 and 2. The words "inwardly" and "outwardly" will refer to the directions toward and away from the geometric center of the device and designated parts thereof. Said terminology will include the words above specifically mentioned, derivatives thereof and words of similar import.

General description

In general, the objects and purposes of the invention are met by providing a nesting shopping carrier comprising an upstanding frame supported on a set of ground engaging casters and a manually engageable handle which allow the carrier to be pushed easily from place to place. An article supporting container, preferably a basket, is supported by the frame. The rearward wall of the basket is preferably hinged in its upper end so that the forward end of another, similar basket may be inserted forwardly thereinto for nesting. The frame includes a rigid portion which underlies and supports the bottom wall of the basket intermediate its ends. The bottom wall of the basket is downwardly stepped just behind the underlying or basket supporting portion of the frame by an amount approximately equal to the thickness of such underlying portion. The forward and rearward portions of the bottom basket wall are preferably sloped upwardly and forwardly at small angles of the horizontal. The lowered rearward portion of the bottom basket wall allows the underlying frame portion of another, similar carrier located to the rear thereof to be moved into the rear end of the basket without interference as such carriers are placed in nesting position.

*Detailed description*

The carrier 10 (FIGURE 1) embodying the present invention includes a frame generally indicated at 11. In the particular embodiment of the invention shown, the frame 11 is comprised of a plurality of rigid, tubular metal members rigidly connected by welding. More particularly, the frame 11 includes a transversely spaced pair of uprights 13 and 14. Each of the uprights 13 and 14 includes a substantially vertical and relatively short lower segment 16, an intermediate segment 17 of greater length which is inclined forwardly at a small angle and an upper segment 18 which is angled somewhat rearwardly. The upper ends of the uprights 13 and 14 are preferably closed by any convenient means here comprising suitable caps 21 which may be of plastic or the like. The intermediate segments 17 of the uprights 13 and 14 are rigidly connected by a vertically spaced, preferably parallel pair of cross braces 23 and 24.

The frame 11 further includes a generally horizontally disposed base member 26 comprising, in the particular embodiment shown, a single piece of bent tubing. The base member 26 includes a transversely extending central portion 27. A pair of side portions 28 and 29 diverge rearwardly from the ends of the central portion 27 at a relatively small acute angle to each other. The rearward ends of the side portions 28 and 29 are rigidly affixed to the forward faces of the lower segments 16, respectively, just above the lower ends thereof. The side portions 28 and 29 are bent adjacent the central portion 27 to slope downwardly and forwardly as indicated at 31 and 32, respectively. Thus, the central portion 27 lies below the plane defined by the rearward part of the base member 26.

The frame 11 further includes a basket support member 36 which underlies the basket, hereinafter described, intermediate its ends. The basket support member 36 comprises, in the present embodiment, a single bent piece of tubing. The basket support member 36 includes a pair of parallel, substantially upstanding legs 37 and 38, the lower ends of which are rigidly affixed to the upper surfaces of the side portions 28 and 29 of the base member 26. The legs 37 and 38 are spaced forwardly identical distances of the rearward uprights 13 and 14, respectively. The legs 37 and 38 are transversely spaced from each other a somewhat lesser distance than are the uprights 13 and 14 due to the rearward divergence of the side portions 28 and 29 of the base member 26. Moreover, the legs 37 and 38 preferably substantially parallel the lower and intermediate segments 16 and 17 of the corresponding uprights 13 and 14. More specifically, each of the legs 37 and 38 comprises a relatively short and substantially vertical, lower segment 41 and a substantially longer and somewhat forwardly sloping upper segment 42, such segments preferably paralleling the corresponding segments 16 and 17 of the rearward uprights.

Figure 2:
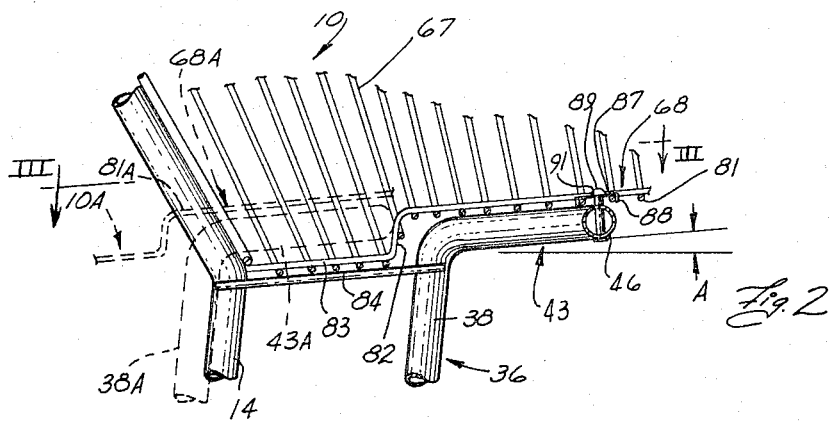
FIGURE 2 is a fragmentary central cross-sectional view of the carrier of FIGURE 1.
Figure 3:
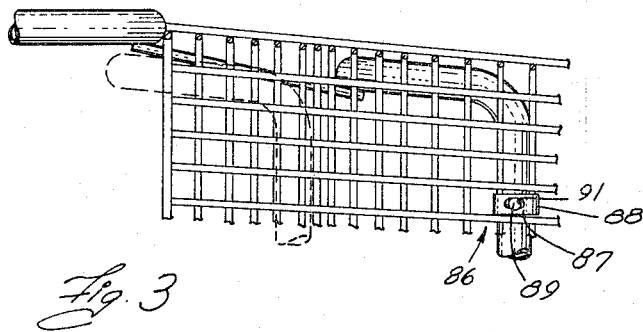
FIGURE 3 is a fragmentary sectional view substantially as taken on the line III—III of FIGURE 2.

The basket support member 36 further includes a basket supporting portion 43 (FIGURES 1 and 2) connecting the upper ends of the legs 37 and 38. The basket supporting portion 43 extends transversely across the carrier 10 and, in the particular embodiment shown, is of a generally U-shaped, rearwardly opening configuration. The basket supporting portion 43 includes a transverse bight 46 which connects through a pair of rearwardly directed, substantially longitudinal portions 47 and 48 to the upper ends of the legs 37 and 38. The longitudinal portions 47 and 48 preferably diverge rearwardly at a small angle as shown in FIGURE 3. The angle of divergence is preferably approximately that of the side portions 28 and 29 of the base member 26. Moreover, the longitudinal portions 47 and 48 preferably slope forwardly and upwardly at a small angle to the horizontal as indicated at A in FIGURE 2.

A cross member 51, here comprising a piece of flat bar stock, is rigidly secured to the lower surface of the base member 26 adjacent the slope portions 31 and 32 thereof and extends transversely of the base member. The cross member 51 is preferably of steel and is preferably affixed by welding to the base member 26. Front swivel casters 52 and 53 are fixed to the front cross member 51 adjacent the ends thereof and are located therebeneath for supporting the forward end of the frame 11. Rear casters 56 and 57 are fixed to the lower ends of the uprights 13 and 14 by any convenient means, not shown, for supporting the rearward end of the carrier 10. Suitable stops 58 engage the rearward ends of the base member 26 to prevent swivelling of the rearward casters 56 and 57 to maintain same longitudinally aligned.

The carrier 10 further includes an article carrying container 61 which is preferably constructed from metal rods welded together to form a mesh. The container or basket 61 has a forward wall 62, a rearward wall 63, side walls 66 and 67 and a bottom wall 68 (FIGURES 1 and 2). In the preferred embodiment of the invention shown, the side walls are integral with the bottom wall, a number of the rods in the bottom wall being continued in the side walls. The side walls 66 and 67 are preferably upstanding and, to allow nesting, preferably converge toward the front ends thereof. The rearward ends of the side walls 66 and 67 are rigidly affixed to the forward face of the upper segments 18 of the uprights 13 and 14 by any convenient means, not shown.

In the particular embodiment shown, the front wall 62 is formed as a closure member operable to open or close the forward end of the basket 61. Further details of the forward wall 62 are disclosed in my copending application Ser. No. 486,161 filed Sept. 9, 1965 and, as a result, further description thereof is not believed required here. Moreover, it will be noted that the present invention is not restricted to the particular openable front wall 62 hereinabove described, it being fully contemplated, for example, that a fixed front wall rigidy attached to the side and bottom walls of the basket 61 may be employed.

The rearward wall 63 is rigidly fixed to and depends from a transverse, manually engageable handle 76 for propelling the carrier 10. The ends of the handle 76 are pivotally supported on the upper ends of the uprights 13 and 14. The side edges of the rearward wall 63 are spaced closely within the uprights 13 and 14 when the rearward wall is closed as in FIGURE 1. The lower edge of the rearward wall 63 preferably bears against the bottom wall 68 adjacent the rearward edge thereof to limit rearward motion thereof. The rearward wall 63 is pivotable forwardly and upwardly about the axis of the handle 76 for opening the rearward end of the basket 61 to allow the basket of another carrier to nest therewithin. The construction of the rearward wall 63 and the handle 76 is disclosed in detail in my copending application Ser. No. 486,000 filed Sept. 9, 1965 and, thus, further description is believed unnecessary.

The bottom wall 68 of the basket 61 has a forward portion 81 which is supported on the basket supporting portion 43 of the basket support member 36. The forward portion 81 extends rearwardly to a point just to the rear of the basket support member 36 whereat the bottom wall 68 is stepped sharply downwardly as indicated at 82 to a level below the forward end of the basket supporting portion 43. The bight 46 is preferably located just forwardly of the middle of the bottom wall 68 of the basket 61. The depth of the step is preferably equal to the diameter of the bight 46. The bottom wall 68 has a rearward portion 83 which extends rearwardly from the stepped portion 82 to the rear edge of said bottom wall. The rearward portion 83 and forward portion 81 of the bottom wall 68 are preferably sloped upwardly and forwardly, such slope preferably being equal to the angle A indicated in FIGURE 2.

Brace rods 84 are preferably provided on each side of the carrier, one extending between the upright 13 and the leg 37 and the other extending between the upright 14 and the leg 38. The forward ends of the brace rods 84 are disposed near the upper ends of the legs 37 and 38. The rearward ends of the brace rods are preferably welded to the opposed faces of the intermediate portions 17 of the uprights 13 and 14 at the upper ends thereof. The brace rods 84 preferably slope upwardly and forwardly at the angle A and snugly underlie the edges of the rearward portion 83 of the bottom wall 68 to assist in supporting same. If desired, the rods of such rearward portion 83 may be secured as by welding to the brace rods 84. The brace rods 84, in addition to assisting in the support of the bottom of the basket, rigidly connect and brace the uprights 13 and 14 and the basket supporting portion 43 with respect to each other.

The forward portion 81 of the bottom wall 68 is preferably secured to the basket supporting portion 43 and, more particularly, to the bight 46 by suitable overlying clamps 86 (FIGURES 2 and 3) at least at a pair of transversely spaced points. In the particular embodiment shown, the clamps 86 each comprise a longitudinally extending strap 87 having downwardly curled ends 88, said curled ends being spaced for gripping adjacent ones of the transverse rods of the bottom wall 68. A suitable fastening member, here a rivet 89, extends downwardly through a longitudinally slotted opening 91 in the central portion of the strap 87 and through a suitable hole in the bight 46 for securely fastening the bottom wall 68 to the basket supporting portion 43.

The shopping carrier 10 preferably further includes a lower shelf 96 of any convenient construction normally disposed between the side portions 28 and 29 of the base member 26.

If desired, the carrier 10 may be provided with a suitable box 98 of any convenient type supported on the inside of the rearward wall 63 of the basket 61 for carrying small articles which might slip through the larger mesh of the basket 61.

If desired, the carrier 10 may also be furnished with a child seat 99 of any convenient type, here, for example, being removably affixed to and between the cross braces 23 and 24 by any convenient means and extending rearwardly therefrom. Alternatively, the box 98 and child seat 99 may be omitted and it is fully contemplated that if desired the rearward wall 63 of the basket 61 may be used to support a collapsible child seat of the type generally disclosed in U.S. Patent No. 2,911,227 assigned to the assignee of the present invention.

*Operation*

Although the operation of the carrier 10 embodying the invention has generally been indicated hereinabove, parts thereof will be summarized to insure a clear understanding of the present invention.

Referring particularly to FIGURE 2, it will be seen that as a further carrier 10A, indicated in broken lines, similar to the carrier 10 is moved forwardly toward and through the rearward end of the carrier 10 for nesting therein, the forward end of the basket of the carrier 10A pushes forwardly against the rearward wall 63 of the carrier 10 in front thereof for causing the rearward wall 63 to pivot forwardly and upwardly about the handle 76. The basket supporting portion 43A of the carrier 10A then moves through the open rearward end of the basket 61 above the rearward portion 83 of the bottom wall 68 thereof toward the stepped portion 82. Forward movement of the basket supporting portion 43A of the rearward carrier 10A is ultimately limited by interference between the forward edge thereof and the stepped portion 82 of the bottom wall 68 of the forward carrier 10. With the carriers 10 and 10A fully nested as in FIGURE 2, the forward edge of the basket supporting portion 43A abuts the stepped portion 82 of the basket bottom of the carrier 10 and is closely spaced to the rear of the basket supporting portion 43 of the carrier 10. In such position, the leg 38A overlaps the upright 14 of the forward carrier 10 longitudinally of the carriers and lies between the uprights 13 and 14. Thus, when the carriers are fully nested, the centers of the legs 38 and 38A are longitudinally spaced by a distance which slightly exceeds the longitudinal spacing between the centers of the leg 38 and the upright 14 below the basket 61. As a result, the length added to the nested line of carriers 10 by nesting a further carrier 10A therein closely approaches the longitudinal spacing of the leg 38 from the upright 14 below the basket 61. When the carriers 10 and 10A are in nested position shown in FIGURE 2, only the forward portion 81A of the basket bottom 68A of the rearward carrier 10A enters the basket 61 of the carrier 10. In the fully nested position shown, the forward portions 81A and 81 of the basket bottoms clear each other.

It should be further noted that the basket bottom 68 is supported for more than half of its length by the brace rod 84 and by the basket supporting portion 43 thus adding materially to its rigidity and load carrying ability.

The carriers 10 and 10A may be released from the nesting position above described simply by moving same longitudinally away from each other thus withdrawing the forward end of the basket of the rearward carrier 10A from the rearward end of the basket of the forward carrier 10 and allowing the rearward wall 63 to pivot downwardly to close the rearward end of the basket 61.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a nesting shopping carrier construction, the combination comprising:
 a frame including a portion extending transversely of the carrier and longitudinal portions extending rearwardly and downwardly at a small angle to the horizontal and affixed to said transverse portion;
 a basket affixed to and supported on said frame, said basket having a bottom wall supported intermediate its ends upon said longitudinal and transverse portions, the portion of said bottom wall above and forward of said transverse and longitudinal portions being upwardly and forwardly sloped in substantial parallelism with said longitudinal portions, said bottom having a rearward portion located to the rear of said transverse and longitudinal portions, said rearward portion being sloped similarly to said forward portion but stepped downwardly therefrom;
 whereby said rearward portion is arranged to receive the longitudinal and transverse portions of a similar carrier driven forwardly thereinto to allow nesting of such carriers.

2. The device defined in claim 1 in which said rearward portion is downwardly stepped from said forward portion by a distance substantially equal to the thickness of said transverse frame portion.

3. The device defined in claim 1 including brace means rigidly affixed to said frame and underlying and supporting said rearward portion of said bottom wall.

4. The device defined in claim 3 in which said brace means and said longitudinal frame portions extend for more than half the length of the basket bottom.

5. The device defined in claim 1 in which the length of said longitudinal portions is substantially similar to the longitudinal extent of the rearward portion of said bottom wall.

6. The device defined in claim 1 in which said frame is comprised of a plurality of tubular metal members secured together by welding and in which said basket is comprised of a plurality of rods welded together to form a mesh.

7. The device defined in claim 1 in which said basket includes a rearward wall hinged adjacent the upper end thereof with respect to said frame, the lower edge of said rearward wall lying on the said rearward portion of said bottom wall adjacent the rearward edge thereof, the distance between the lower edge of said rearward wall and the axis upon which same is pivoted being less than the distance between such pivot axis and the stepped portion of said bottom wall.

8. In a nesting shopping carrier construction, the combination comprising:

a frame including a rearwardly opening, substantially U-shaped portion having a bight portion extending transversely of the carrier and longitudinal portions extending rearwardly and downwardly at a small angle to the horizontal;

a basket affixed to and supported on said frame, said basket having a bottom wall supported intermediate its ends upon said U-shaped portion, the portion of said bottom wall above and forward of said U-shaped portion being upwardly and forwardly sloped in substantial parallelism with said longitudinal portions, said bottom having a rearward portion located to the rear of said U-shaped portion, said rearward portion being sloped similarly to said forward portion but stepped downwardly therefrom;

whereby said rearward portion is arranged to receive the portion of a similar carrier driven forwardly thereinto to allow nesting of such carriers.

9. The device defined in claim 8 in which said frame includes a base portion supported on said wheels and a pair of upstanding legs extending upwardly from said base portion, the upper end of said legs being joined to the free ends of said U-shaped portion, said frame further including a pair of uprights spaced rearwardly of said legs and extending upwardly therebeyond, the rearward end of said basket being affixed to said uprights above said legs;

a longitudinally extending brace fixed to each of said legs and extending rearwardly therefrom to the corresponding one of said uprights and being rigidly affixed thereto, said braces being provided to rigidify the said legs and uprights, said braces underlying and supporting the rearward portion of said basket.

10. The device defined in claim 9 in which said basket has substantially upstanding sides and said longitudinal portions and said braces lie adjacent said sides, at least said sides and longitudinal portions diverging rearwardly at a small angle, the transverse zone being occupied by said legs being of lesser width than the distance between said uprights.

11. In a nesting shopping carrier construction, the combination comprising:

a frame having an underlying portion, and wheels supporting said frame;

a container having a bottom wall supported intermediate its ends on the underlying portion of said frame, said bottom wall having first and second portions with said first portion being downwardly stepped relative to said second portion, said first portion being located on one side of said underlying portion, the adjacent edges of said first and second portions being closely adjacent but laterally spaced from one another, said bottom wall further including an intermediate portion interconnecting the adjacent edges of said first and second portions, said first portion being adapted to receive the underlying portion of a similar carrier driven therein to allow nesting of such carriers.

References Cited

UNITED STATES PATENTS

| | | |
|---|---|---|
| D. 190,280 | 5/1961 | Hummer. |
| 2,596,775 | 5/1952 | Kasper _____ 280—33.99 |
| 2,898,123 | 8/1959 | Davis et al. _____ 280—33.99 |
| 2,911,227 | 11/1959 | Davis _____ 280—33.99 |
| 3,157,871 | 11/1964 | Umanoff. |

BENJAMIN HERSH, *Primary Examiner.*

MILTON L. SMITH, *Assistant Examiner.*